United States Patent [19]

Sato

[11] Patent Number: 5,464,250

[45] Date of Patent: Nov. 7, 1995

[54] BAG SUITABLE FOR USE IN AN AIR BAG APPARATUS AND METHOD OF MANUFACTURING THE SAME

[75] Inventor: Koki Sato, Aichi, Japan

[73] Assignee: Kabushiki Kaisha Tokai-Rika-Denki-Seisakusho, Aichi, Japan

[21] Appl. No.: 75,797

[22] Filed: Jun. 14, 1993

[30] Foreign Application Priority Data

Jun. 17, 1992 [JP] Japan .................................. 4-158061

[51] Int. Cl.⁶ .................................................. B60R 21/20
[52] U.S. Cl. ............................ 280/743.1; 280/730.1; 280/743.2
[58] Field of Search ........................... 280/743 A, 743 R, 280/729, 728 R, 730 A

[56] References Cited

U.S. PATENT DOCUMENTS 3,630,472  12/1971  Axenborg .................. 280/729

5,018,762   5/1991  Suzuki et al. ................. 280/731
5,172,790  12/1992  Ishikawa et al. ............. 280/730 A

FOREIGN PATENT DOCUMENTS 1-84236    6/1989  Japan .
2-37060    2/1990  Japan ..................... 280/743 A
2-132555  11/1990  Japan .
4-35051    3/1992  Japan .

Primary Examiner—Eric D. Culbreth
Attorney, Agent, or Firm—Fisher & Associates

[57] ABSTRACT

A bag expandable when an air bag apparatus is activated. A single continuous strap member is alternately sewn on upper and lower fabrics so as to define a plurality of chambers in the bag comprised of the upper and lower fabrics along a predetermined direction. Thus, the single strap member may be successively sewn on the upper and lower fabrics over a range from one end of the strap member to the other end thereof, with the result that the manufacturing cost of the bag can be reduced.

20 Claims, 10 Drawing Sheets

BAG SUITABLE FOR USE IN AN AIR BAG APPARATUS AND METHOD OF MANUFACTURING THE SAME

BACKGROUND OF THE INVENTION

1. Field of the Invention

The present invention relates to a bag which is Suitable for use in an air bag apparatus activated upon action of a predetermined load and which is expanded toward the side of an occupant when the air bag apparatus is activated and to a method of manufacturing the bag.

2. Description of the Related Art

In an air bag apparatus of such a type that it is provided inside a vehicle door, for example, a bag is expanded toward the side of an occupant seated on his/her seat where a predetermined load is externally applied to the vehicle door. Thus, the occupant is protected from an impact produced when such a load is applied to the door.

Since a space defined between a trim of the vehicle door and an occupant's side is narrow, this type of air bag apparatus differs from an air bag apparatus or the like used for a driver's seat. Further, a large restriction is imposed on the shape of the bag, specifically its thickness. Therefore, the bag is shaped in the form of a thin rectangular parallelopiped.

When the predetermined load is externally applied to the vehicle door so as to expand the bag, the occupant is protected from the impact by abutting against the bag. Simultaneously, however, the pressure in the bag abruptly increases upon abutment of the occupant against the bag. It is thus necessary to improve the strength of the bag in order to ensure cushioning properties (energy absorption properties) of the bag.

When a plurality of reinforcing fabrics or the like are simply superimposed and sewn on a bag or when a number of reinforcing fabrics are provided inside the bag in order to improve the strength of the bag shaped in the form of the thin rectangular parallelopiped as described above, a lot of labor becomes cumbersome and the efficiency of work is reduced. Thus, the manufacturing cost is extremely high.

SUMMARY OF THE INVENTION

With the foregoing in view, it is an object of the present invention to provide a bag suitable for use in an air bag apparatus, which is capable of ensuring a large strength due to its simple structure and providing easy fabrication and low cost and to provide a method of fabricating the bag.

According to one aspect of the present invention, for achieving the above object, there is provided a bag suitable for use in an air bag apparatus activated upon application of a predetermined load or above, the bag being expandable toward the side of an occupant, the bag comprising:

a first fabric disposed to be positioned on the occupant side upon activation of the air bag apparatus;

a second fabric disposed to be positioned on the side of a gas generating inflator mounted to a vehicle body, and having peripheral ends respectively sewn on peripheral ends of the first fabric so as to form the bag;

at least a single continuous strap member having a dimension narrower than a dimension of the bag, extending in a first direction thereof, the strap member being alternately sewn on the first and second fabrics thereby to divide the inside of the bag into a plurality of chambers along a second direction orthogonal to the first direction; and communicating means for causing the adjoining chambers of the plurality of chambers to communicate with each other.

In the bag of the present invention which is suitable for use in the air bag apparatus, an upper fabric (first fabric) is expanded in a state being disposed on the occupant side upon operation of the air bag apparatus so as to protect the occupant.

Since the upper fabric and a lower fabric (second fabric) are alternately sewn and connected to each other by the single continuous strap member, the bag can ensure a large strength. Further, the bag is simplified in structure and reduced in cost. Since the plurality of chambers divided and defined within the bag by the strap member communicate with each other, the internal pressure is uniformly transmitted to the respective chambers and not applied thereto in a partially biased state even if the pressure in the bag abruptly increases due to the abutment of the occupant against the bag. Thus, the bag is brought to a high strength and its cushioning properties are not reduced.

According to a second aspect of the present invention, there is provided a method of manufacturing a bag suitable for use in an air bag apparatus activated upon application of a predetermined load or above, the bag including a first fabric disposed to be positioned on the occupant side upon activation of the air bag apparatus and a second fabric disposed on the side of a gas generating inflator mounted to a vehicle body, and being formed by sewing peripheral ends of the first and second fabrics on each other in bag form and being expandable toward the side of the occupant, the method comprising the following steps:

a first step of sewing together portions of the peripheral ends of the first and second fabrics;

a second step of sewing one end of a strap member on one of the first and second fabrics, the strap member being narrower than the first and second fabrics between the first and second fabrics;

a third step of sewing the intermediate portion of the strap member on the other of the first and second fabrics so as to define one chamber inside of the bag by the strap member;

a fourth step of alternately sewing the strap member on the first and second fabrics so as to successively define a desired number of chambers in a predetermined direction; and a fifth step of sewing together the remaining peripheral ends of the first and second fabrics after completion of the fourth step.

In the method of fabricating the bag suitable for use in the air bag apparatus, the bag is formed by alternately sewing the single continuous strap member on the upper and lower fabrics so that the upper and lower fabrics and the strap member are connected to one another. That is, the sewing of the strap member on the upper and lower fabrics over a range from one peripheral end of the bag to the other peripheral end thereof is successively continuously effected thereby to complete a sewing process.

Accordingly, the bag can be manufactured under a series of simple operations and reduced in cost. Since the upper and lower fabrics are alternately sewn and connected to each other by the strap member, the bag can ensure a large strength. Further, since the plurality of chambers divided and defined within the bag by the strap member after completion of the sewing process communicate with each other, the internal pressure is uniformly transmitted to the respective chambers and not applied thereto in a partially biased state even if the pressure in the bag abruptly increases due to the abutment of the occupant against the bag. Thus, the bag is brought to a high strength and its cushioning properties are not reduced.

The bag suitable for use in the air bag apparatus, according to the present invention and the method of fabricating the bag, according to the present invention, as has been described above, can bring about excellent effects in that a large strength can be ensured due to a simple structure of the bag and the fabrication and cost of the bag are respectively easy and low.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
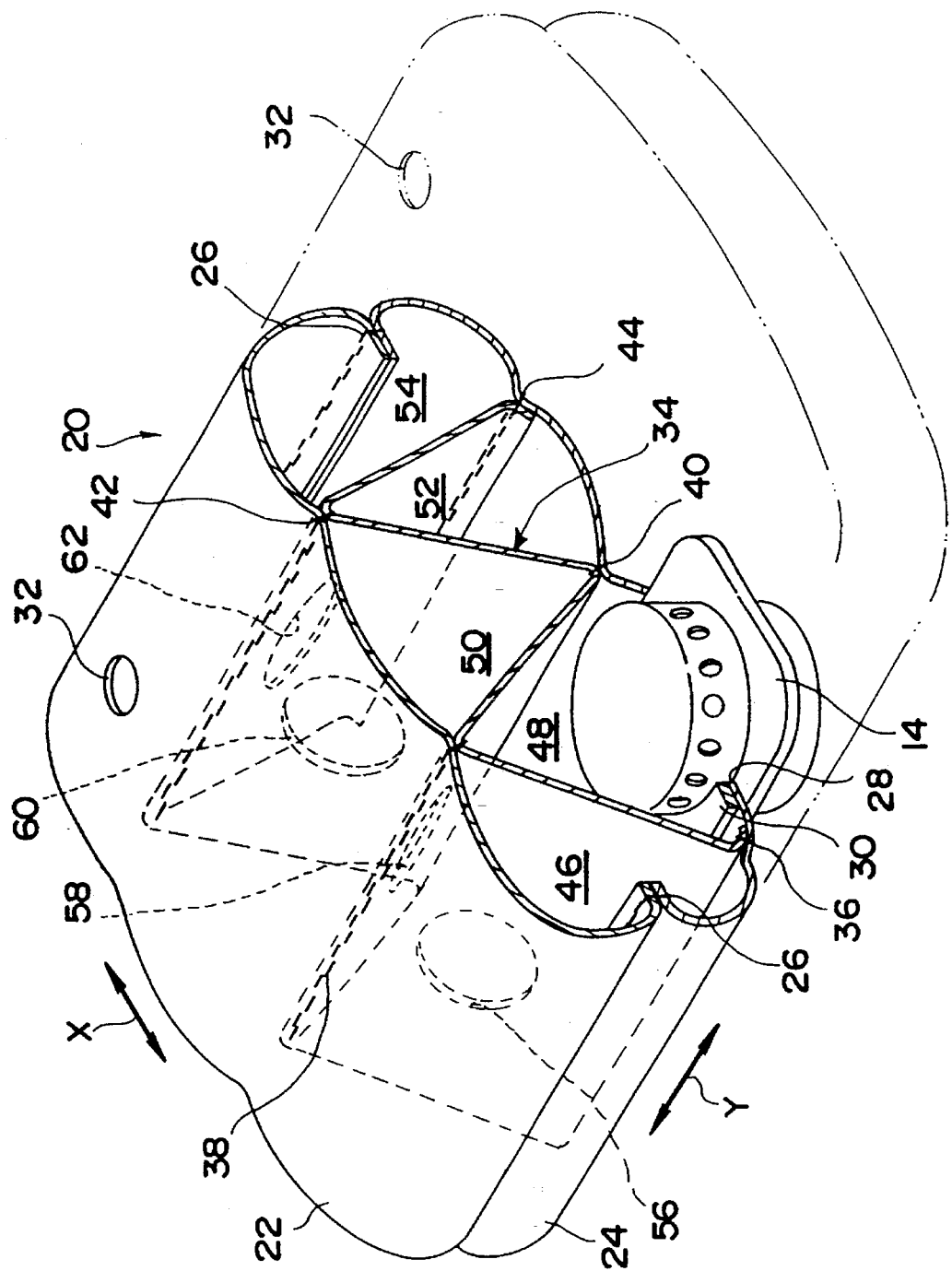
FIG. 1 is a partly broken perspective view showing a bag according to a first embodiment of the present invention.
Figure 2:
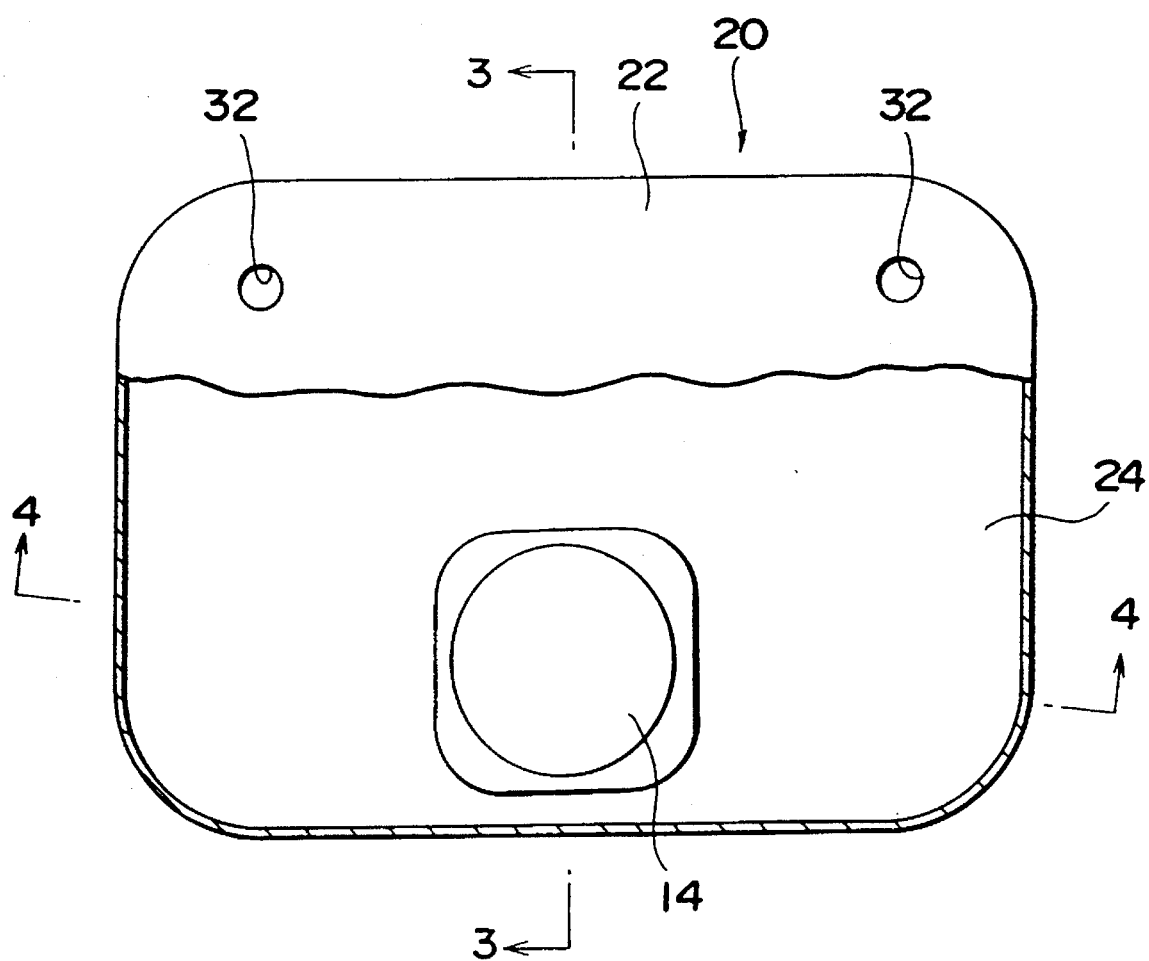
FIG. 2 is a partly broken plan view illustrating the bag shown in FIG. 1.
Figure 3:
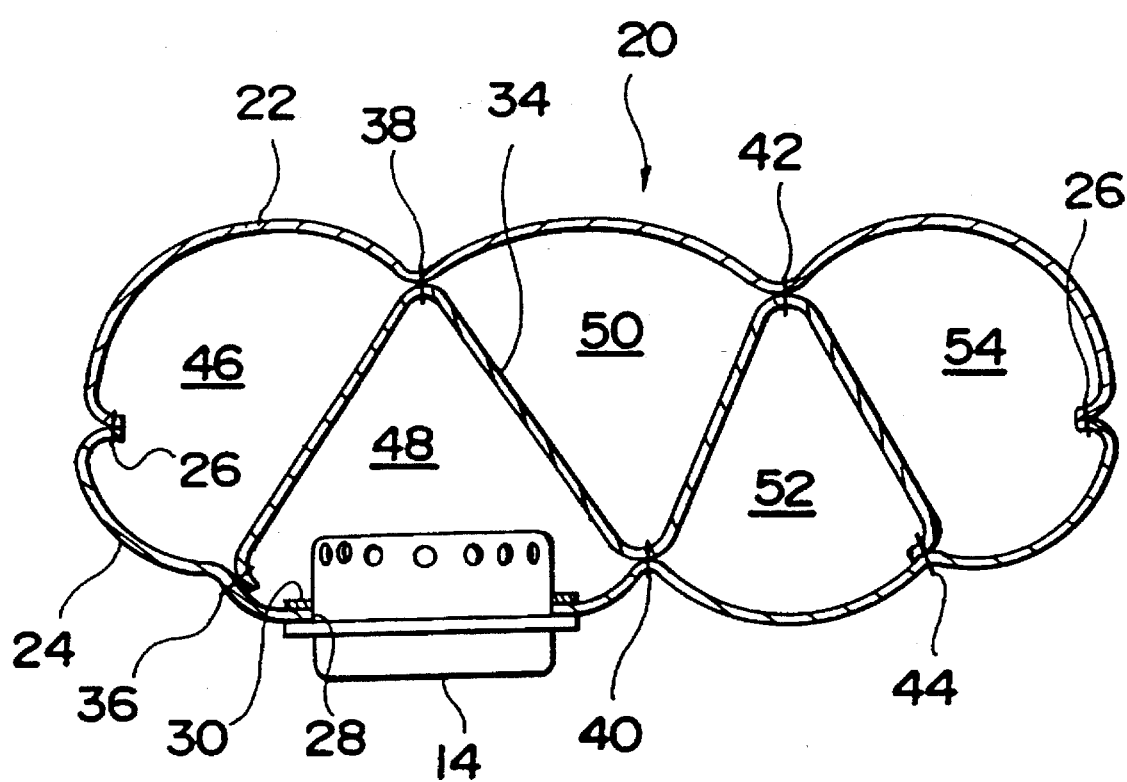
FIG. 3 is a cross-sectional view of the bag taken along line 3—3 of FIG. 2.
Figure 4:
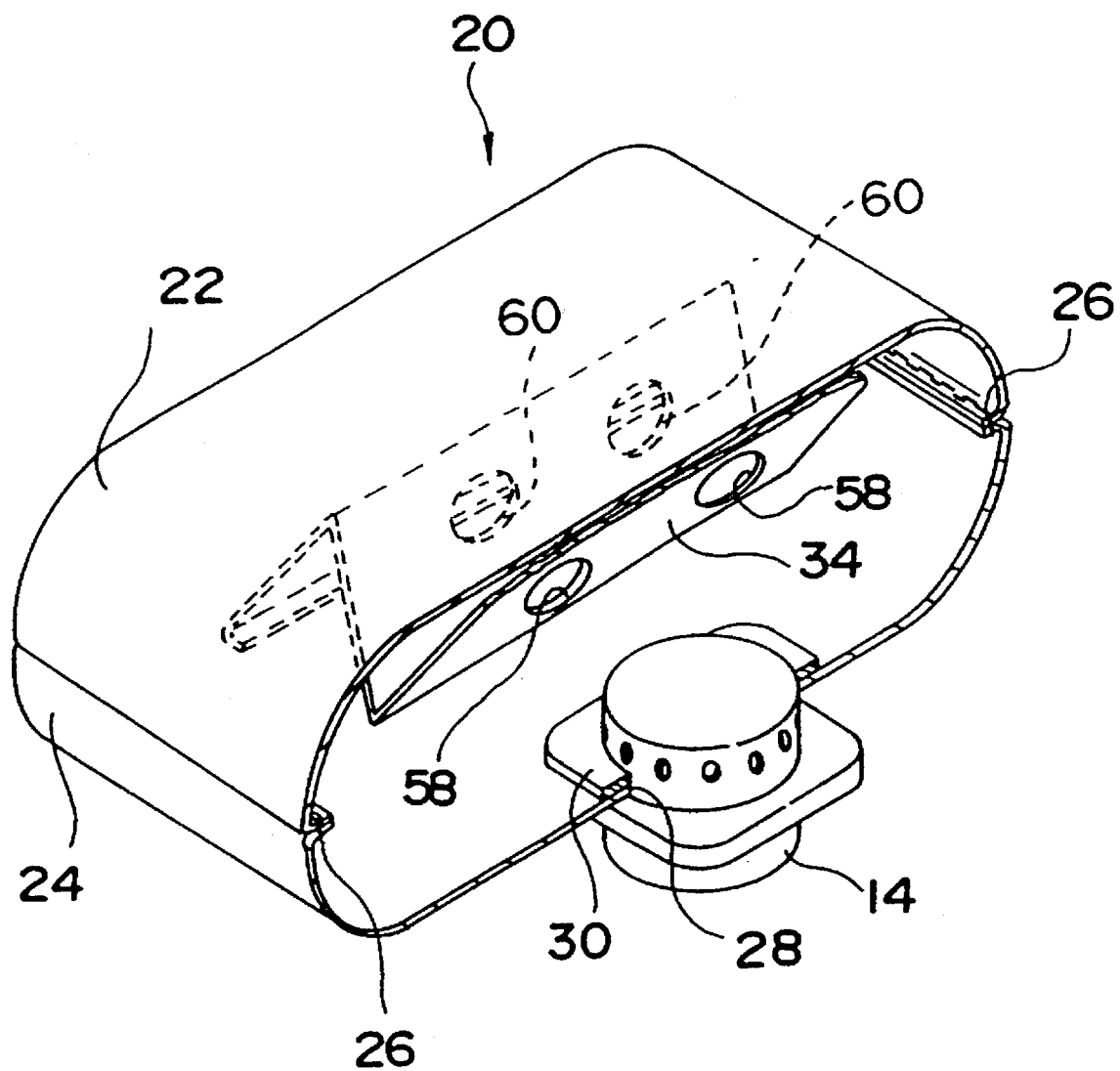
FIG. 4 is a sectional perspective view of the bag, taken along line 4—4 of FIG. 2.
Figure 5:
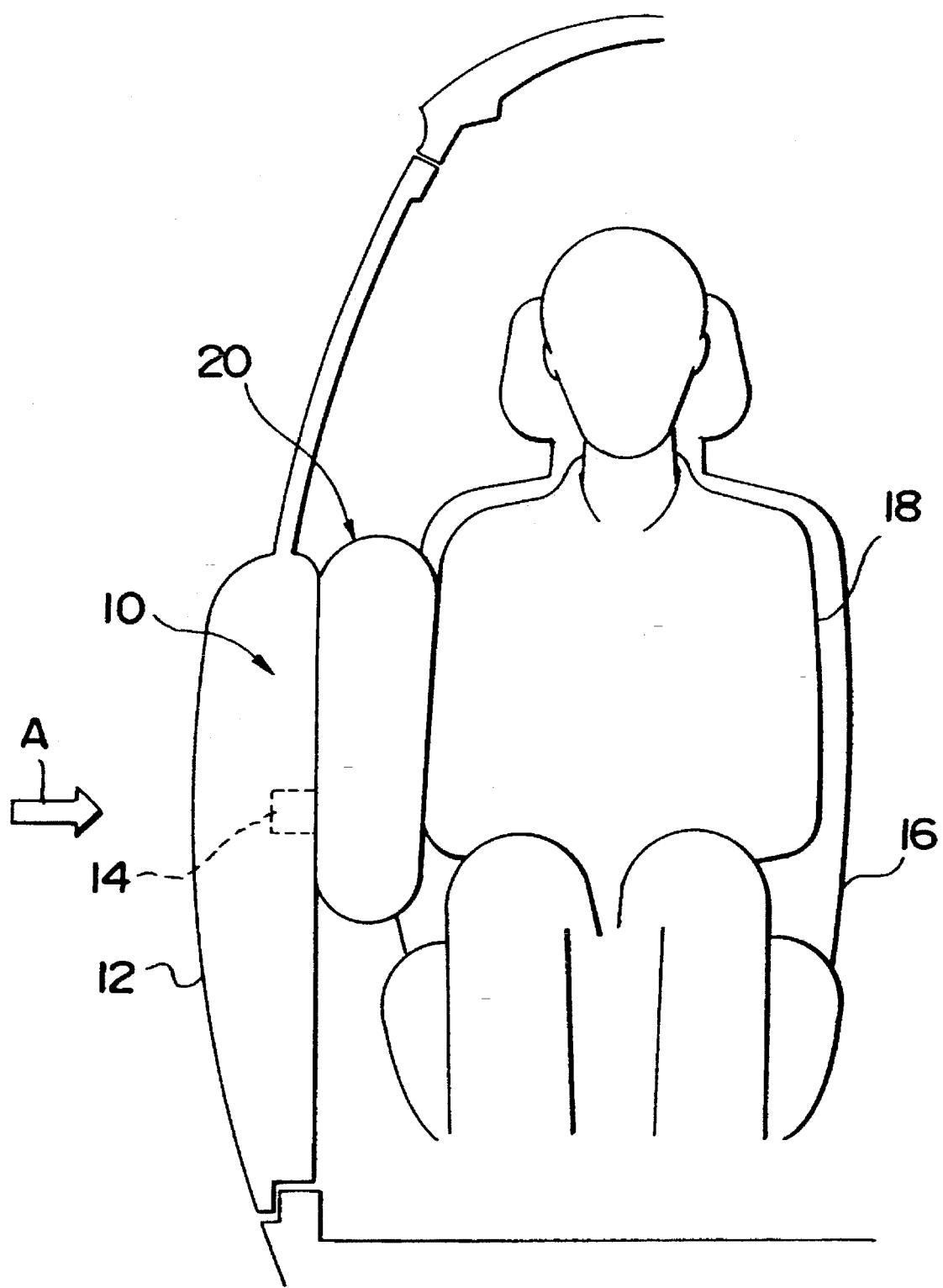
FIG. 5 is a schematic view showing the overall structure of an air bag apparatus to which a bag has been applied.

FIG. 5 is a schematic view showing the overall structure of an air bag apparatus 10 to which a bag 20 according to a first embodiment of the present invention has been applied.

The air bag apparatus 10 is provided between outer and inner panels of a vehicle door 12 on the driver's seat side. The air bag apparatus 10 has a sensor for sensing a predetermined load applied to the door 12 from the outside due to the deformation of the outer panel, which occurs when the predetermined load acts on the door 12 along the direction indicated by the arrow A in FIG. 5, for example. Further, the air bag apparatus 10 has an inflator 14 as shown in FIGS. 1 through 4. The inflator 14 is filled with unillustrated gas generating materials which are energized by the turning ON of the sensor and produce gas under the action of heat. Thus, when the predetermined load acts on the outer panel of the door 12, the sensor detects it thereby to bring the gas generating materials into combustion so as to produce a large quantity of gases from the inflator 14.

The bag 20 is held in a folded state at the position on the vehicle interior side where the inflator 14 is disposed. Now, FIGS. 1 through 4 show a state in which the bag 20 has been expanded toward an occupant 18 seated on a seat 16. The structure of the bag 20 will be described below with reference to its expanded state.

The bag 20 is formed by sewing two textile bases at predetermined positions. That is, the bag 20 has an upper fabric 22 on the vehicle interior side (i.e., on the occupant 18 side) and a lower fabric 24 on the vehicle exterior side each of which has a cross section cut in the form of a rectangle. The bag 20 is formed by sewing the outer peripheral edges of the upper and lower fabrics 22 and 24 with sewing thread 26 in a state in which the outer peripheral edges thereof have been folded inwardly and superimposed on one another. That is, the sewn outer peripheral edges, i.e., the stitches of the upper and lower fabrics 22 and 24 are disposed inside the bag 20.

The lower fabric 24 has a mounting hole 28 defined therein so as to correspond to the inflator 14. In a state in which the inflator 14 has been inserted into the mounting hole 28, the peripheral edge of the mounting hole 28 is interposed between ring plates 30 so as to fix the lower fabric 24 to the inflator 14.

Degassing holes 32 are defined in the vicinity of transversely-extending ends of the upper fabric 22.

On the other hand, a strap member 34 is provided inside the bag 20 in a sewn state. The strap member 34 is formed so as to have a dimension slightly shorter than that extending along the longitudinal direction (i.e., the direction indicated by the arrow Y in FIG. 1) of each of the upper and lower fabrics 22 and 24. The strap member 34 is alternately sewn on the upper and lower fabrics 22 and 24.

That is, one end of the strap member 34 is sewn on the lower fabric 24 in the vicinity of the inflator 14 with sewing thread 36. Further, a longitudinally-extending intermediate portion of the strap member 34 is sewn on the upper fabric 22 with sewing thread 38 and folded so as to be sewn on the lower fabric 24 with sewing thread 40. Further, the longitudinally-extending intermediate portion of the strap member 34 is folded again and sewn on the upper fabric 22 with sewing thread 42. In addition, the other end of the strap member 34 is sewn on the lower fabric 24 with sewing thread 44. The inside of the bag 20 is divided into five expansion rooms or chambers 46, 48, 50, 52 and 54 by the strap member 34 so as to extend along the transverse direction of the bag 20.

Further, the strap member 34 has communication holes 56, 58, 60 and 62 which extend therethrough. Therefore, the expansion chambers 46, 48, 50, 52 and 54 communicate with one another through the communication holes 56, 58, 60 and 62 respectively as well as through regions (space defined between the upper and lower fabrics 22 and 24) extending outwardly from the transversely-extending both ends of the strap member 34.

Figure 6:
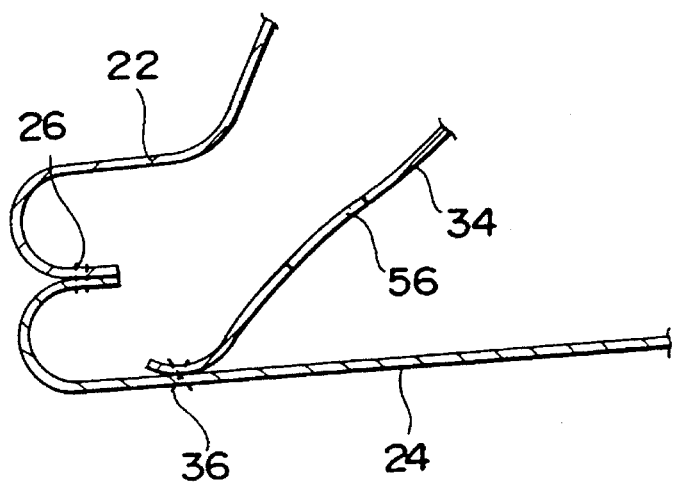
FIG. 6 is a cross-sectional view for describing a bag producing procedure.
Figure 7:
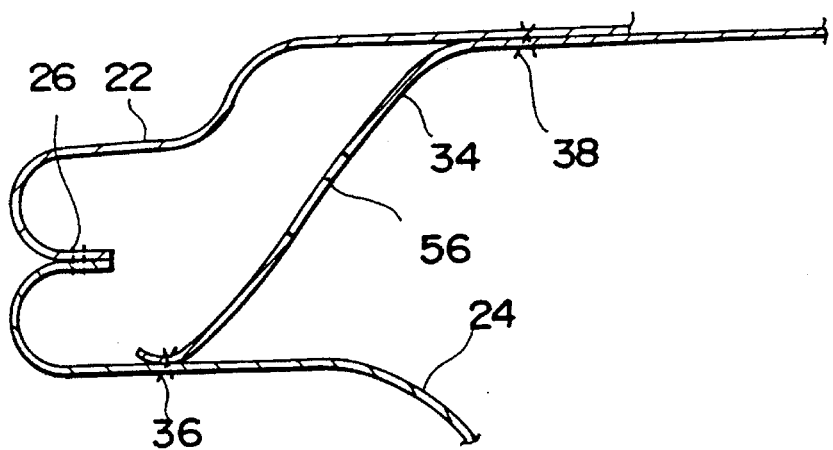
FIG. 7 is a cross-sectional view for describing another bag producing procedure.
Figure 8:
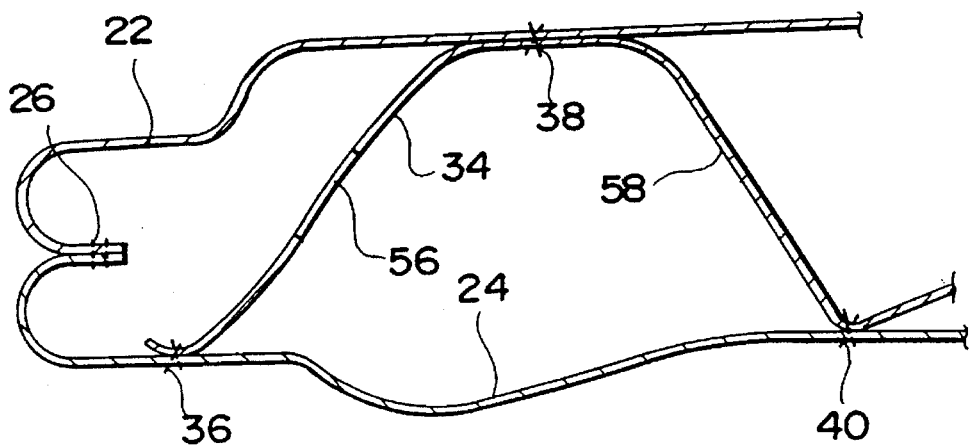
FIG. 8 is a cross-sectional view for describing a further bag producing procedure.

The operation of the present embodiment will next be described together with procedures for fabricating the bag 20. FIGS. 6 through 8 are cross-sectional views for describing the procedures for producing the bag 20.

When it is desired to fabricate the bag 20 constructed as described above, the communication holes 56, 58, 60 and 62 are first defined at predetermined intervals in the strap member 34 cut to the dimension shorter than that of each of the upper and lower fabrics 22 and 24 so as to extend along the longitudinal direction of the strap member 34.

As shown in FIG. 6, the one end of the strap member 34 is next sewn, with the sewing thread 36, on the lower fabric 24 of both the upper and lower fabrics 22 and 24 whose portions of the outer peripheral edges have been sewn on each other with the sewing thread 26. The intermediate portion of the strap member 34 between the communication holes 56 and 58 is then sewn on the upper fabric 22 with the sewing thread 38 in a state spaced away from the communication hole 56 as shown in FIG. 7. Further, the intermediate portion of the strap member 34 between the communication holes 58 and 60 is sewn on the lower fabric 24 with the sewing thread 40 in a state spaced away from the communication hole 58 as shown in FIG. 8. Similarly, the intermediate portion of the strap member 34 between the communication holes 60 and 62 is sewn on the upper fabric 22 with the sewing thread 42 in a state distant from the communication hole 60. Further, the other end of the strap member 34 is sewn on the lower fabric 24 with the sewing thread 44. After the sewing of the strap member 34 has been completed, other peripheral ends of the upper and lower fabrics 22 and 24 are sewn together thereby to complete the sewing of the bag 20.

Thus, the bag 20 having the five expansion chambers 46, 48, 50, 52 and 54 whose insides are defined along the transverse direction thereof and which communicate with each other, is fabricated.

The bag 20, which has been fabricated in accordance with the above procedures, is normally accommodated between the outer and inner panels of the door 12 in a folded state (when the air bag apparatus 10 is in a non-operated state).

When a predetermined load acts on the door 12 along the direction indicated by the arrow A in FIG. 5 from this condition, for example, the outer panel of the door 12 is deformed to turn ON the sensor. As a result, the gas generating materials in the inflator 14 are subjected to combustion so that a large quantity of gases are introduced into the expansion chamber 48 of the bag 20. Since the expansion chamber 48 is in communication with the expansion chambers 46, 50, 52 and 54 through the regions extending outwardly from the transversely-extending both ends of the strap member 34 and the respective communication holes 56, 58, 60 and 62, the gases introduced into the expansion chamber 48 instantaneously flows into the expansion chambers 46, 50, 52 and 54. As a result, the bag 20 is expanded toward the side of the occupant 18 while an air bag door serving as a part of an unillustrated door trim is being opened. Thus, the side of the occupant 18 is brought into abutment against the expanded bag 20 so as to reduce the load applied to the occupant 18, thereby protecting the occupant 18.

Since the upper and lower fabrics 22 and 24 are alternately sewn and connected to each other by the single continuous strap member 34, the bag 20 can ensure a high strength. Further, the bag 20 is simplified in structure and reduced in cost. In the bag 20, the five expansion chambers 46, 48, 50, 52 and 54 divided and defined by the strap member 34 communicate with one another through the regions extending outwardly from the transversely-extending both ends of the strap member 34 and the communication holes 56, 58, 60 and 62. Thus, even if the pressure in the bag 20 abruptly increases due to the abutment of the occupant 18 against the bag 20, the internal pressure of the bag 20 is uniformly transmitted to the expansion chambers 46, 48, 50, 52 and 54 and not applied thereto in a partially biased state. Therefore, the bag 20 is brought to a high strength and its cushioning performance is not reduced.

The bag 20 is produced by alternately sewing the single continuous strap member 34 on the upper and lower fabrics 22 and 24 so as to connect the upper and lower fabrics 22 and 24 and the strap member 34 to one another. That is, the sewing of the strap member 34 on the upper and lower fabrics 22 and 24 over a range from one peripheral end of the bag 20 to the other peripheral end thereof is successively continuously effected to complete a sewing process. Accordingly, the bag 20 can be manufactured under a series of simple operations and reduced in cost.

In the first embodiment, the five expansion chambers 46, 48, 50, 52 and 54 are defined in the bag 20 by alternately sewing the strap member 34 on the upper and lower fabrics 22 and 24. However, the present invention is not necessarily limited to the present embodiment. The number of the expansion chambers can be increased and decreased as needed by increasing and decreasing the number of the sewing points of the strap member 34.

Another embodiment of the present invention will now be described below. Incidentally, parts basically identical to those employed in the first embodiment are identified by the same reference numerals as the first embodiment and their description will therefore be omitted.

Figure 9:
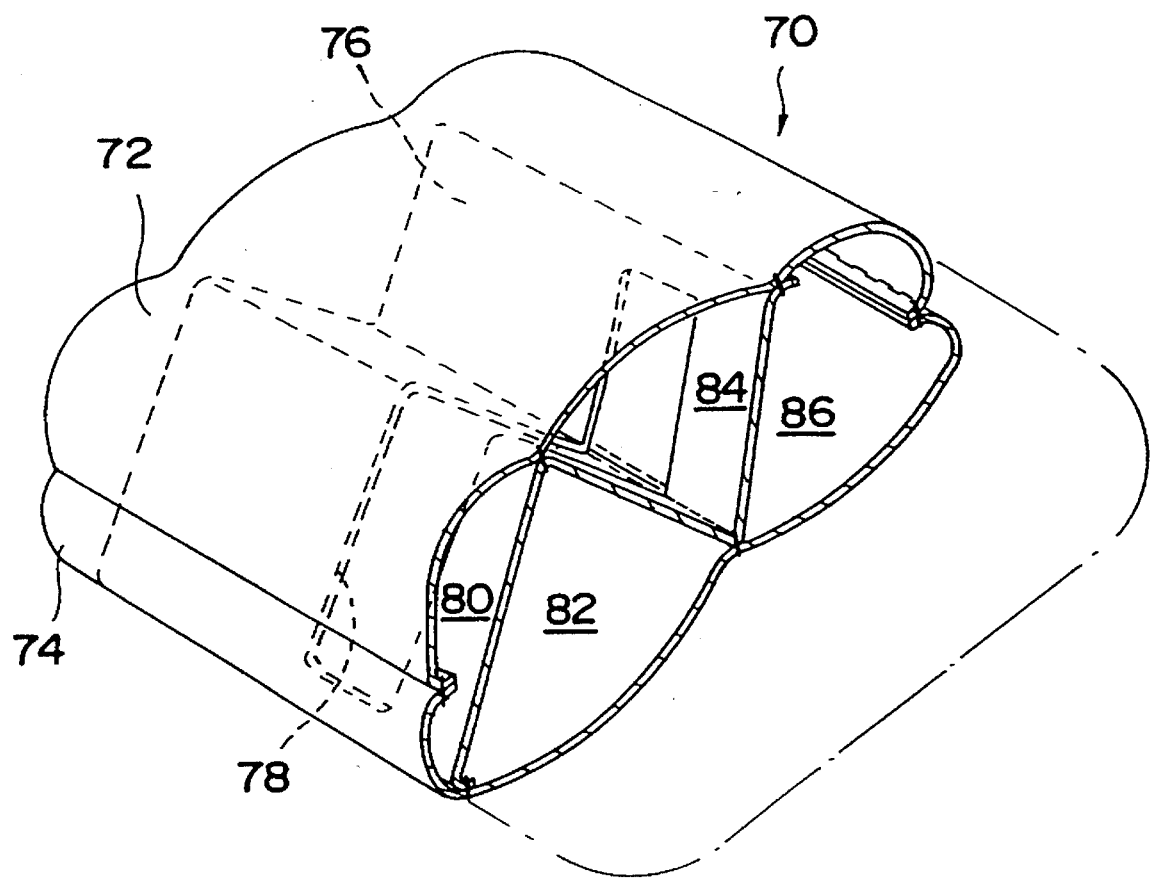
FIG. 9 is a partly broken perspective view showing a bag according to a second embodiment of the present invention.
Figure 10:
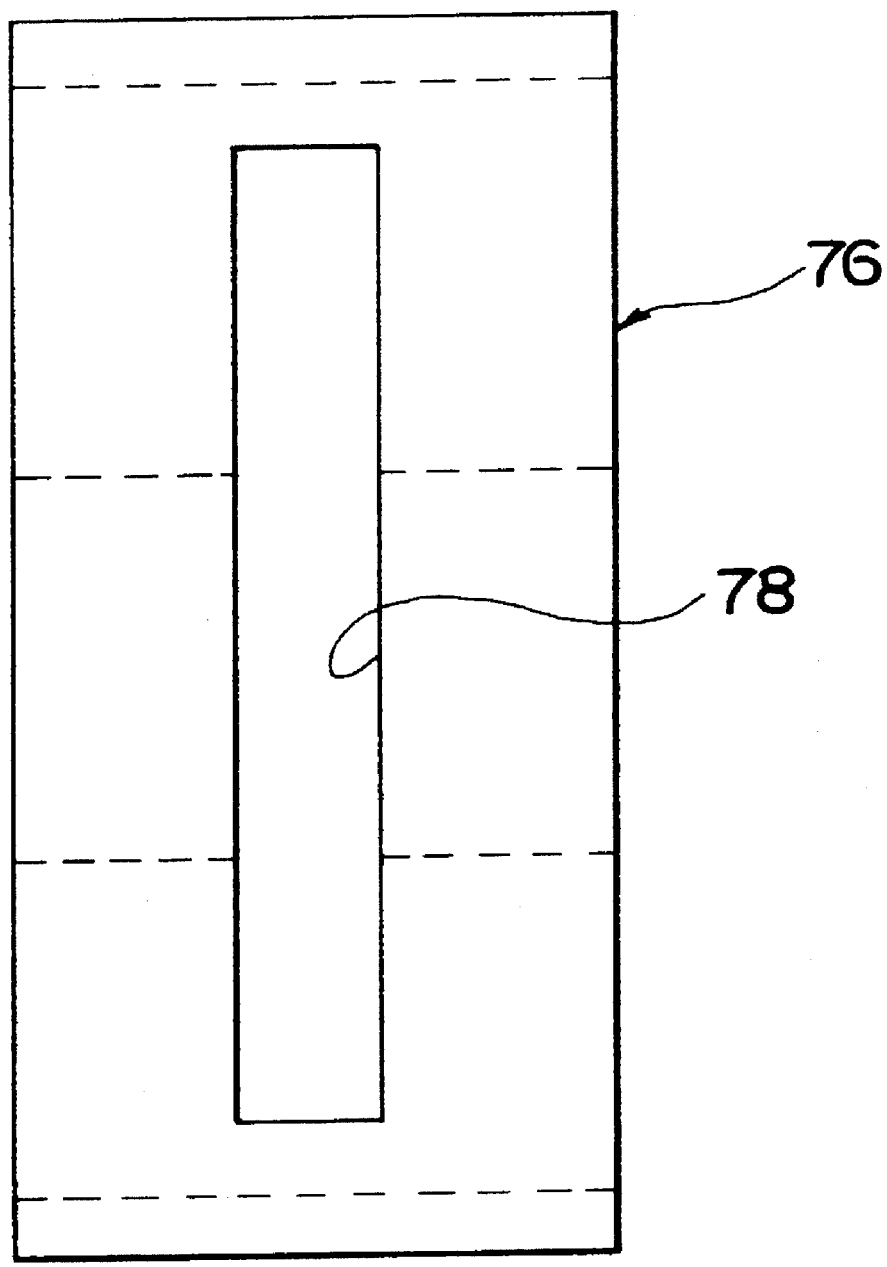
FIG. 10 is a plan view illustrating a non-sewn strap member employed in the bag shown in FIG. 9.

FIG. 9 is a partially broken perspective view of a bag 70 according to a second embodiment. The bag 70 is formed by sewing an upper fabric 72 on a lower fabric 74. Further, a strap member 76 is used as an alternative to the strap member 34 employed in the bag 20. The strap member 76 has a communication hole 78 defined therein as an alternative to the communication holes 56, 58, 60 and 62 of the strap member 34. As shown in FIG. 10, the communication hole 78 is continuously defined in the non-sewn strap member 76 along its longitudinal direction. Similarly to the first embodiment, the strap member 76 is alternately sewn on the upper and lower fabrics 72 and 74 of the bag 70. Thus, the upper and lower fabrics 72 and 74 and the strap member 76 are integrally connected to one another. Further, the inside of the bag 70 is divided into expansion chambers 80, 82, 84 and 86 which communicate with each other through the communication hole 78.

Thus, the upper and lower fabrics 72 and 74 are alternately sewn and connected to each other by the continuous strap member 76 even in the case of the bag 70 according to the second embodiment. Therefore, the bag 70 can ensure large strength. Further, the bag 70 can be simplified in structure and reduced in cost. Since the expansion chambers 80, 82, 84 and 86 divided and defined within the bag 70 by the strap member 76 communicate with each other through the communication hole 78, the internal pressure in the bag 70 is uniformly transmitted to the respective expansion chambers 80, 82, 84 and 86 and not applied thereto in a partially biased state even if the pressure in the bag 70 abruptly increases due to the abutment of an occupant 18 against the bag 70. Thus, the bag 70 is brought to a high strength and its cushioning performance is not reduced. Further, the bag 70 is also produced by alternately sewing the strap member 76 on the upper and lower fabrics 72 and 74 so as to connect the upper and lower fabrics 72 and 74 and the strap member 76 to one another. Therefore, the bag 70 can be fabricated under a series of simple operations and reduced in cost.

In the second embodiment, the four expansion chambers 80, 82, 84 and 86 are defined in the bag 70. Even in the case of the bag 70, however, the number of these expansion chambers can be increased and decreased as necessary by increasing and decreasing the number of the sewing points of the strap member 76. In the second embodiment as well, the communication hole 78 is defined in the non-sewn strap member 76 along its longitudinal direction. However, a plurality of communication holes 78 may be defined in the strap member 76.

Figure 11:
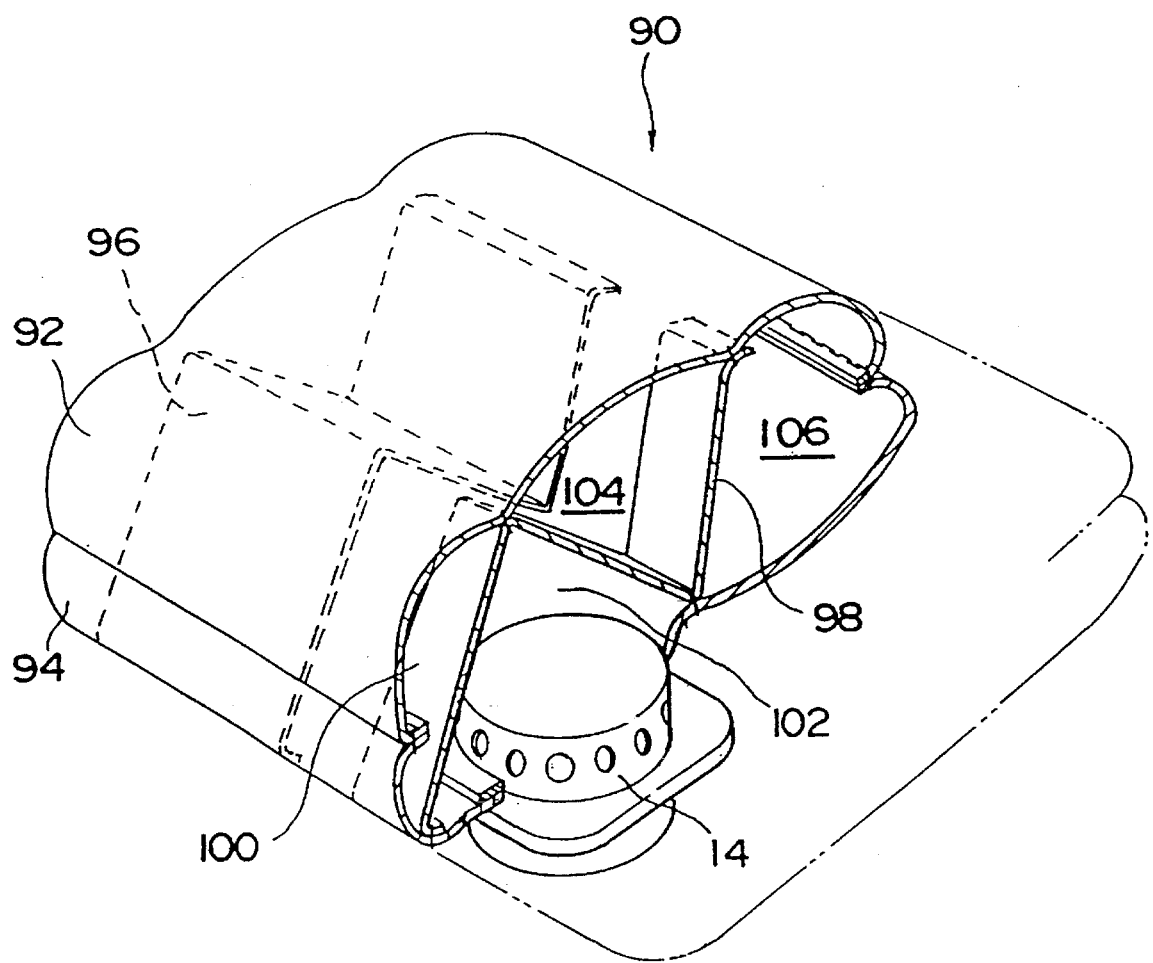
FIG. 11 is a partly broken perspective view depicting a bag according to a third embodiment of the present invention.
Figure 12:
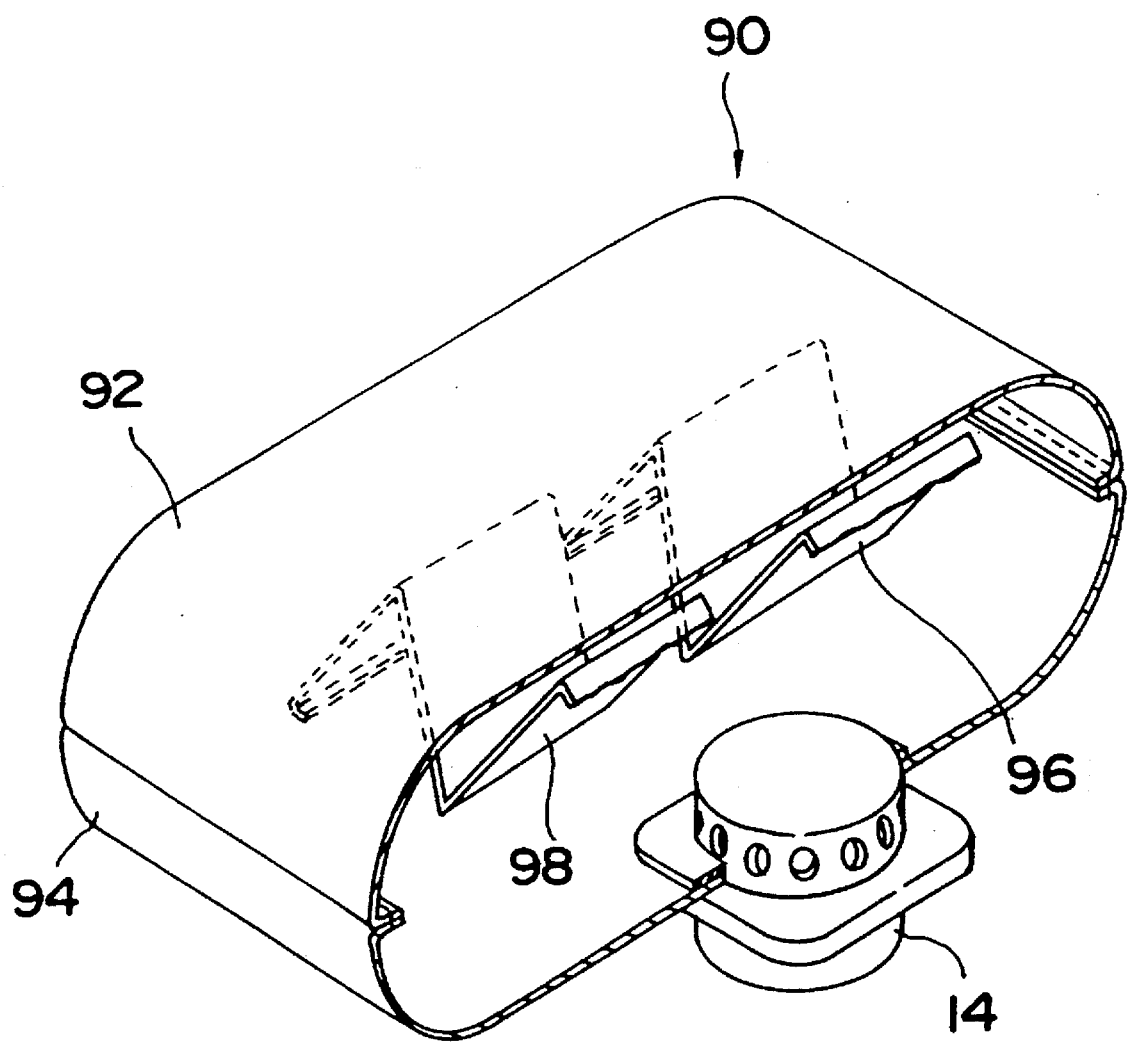
FIG. 12 is a partly broken perspective view illustrating the bag shown in FIG. 11.

A further embodiment of the present invention will next be described. FIG. 11 is a partially broken perspective view showing a bag 90 according to a third embodiment of the present invention. FIG. 12 is a cross-sectional view of the bag 90.

The bag 90 differs from the bags 20 and 70 in that two strap members 96 and 98 are used. Each of the strap members 96 and 98 is formed to have a dimension which is half or less the longitudinal-extending dimension of each of upper and lower fabrics 92 and 94 of the bag 90. Further, each of the strap members 96 and 98 is alternately sewn on the upper and lower fabrics 92 and 94 in the same manner as the aforementioned embodiments. In this case, the strap members 96 and 98 are sewn in a state spaced away from each other. Therefore, expansion rooms or chambers 100, 102, 104 and 106 defined in the bag 90 communicate with one another through regions extending outwardly from the transversely-extending both ends of the strap members 96 and 98.

Even in the case of the bag 90 according to the third embodiment, the upper and lower fabrics 92 and 94 are alternately sewn and connected to each other by the continuous strap members 96 and 98. Therefore, the bag 90 can ensure large strength. Further, the bag 90 can be simplified in structure and reduced in cost. Since the expansion chambers 100, 102, 104 and 106 divided and defined within the bag 90 by the strap members 96 and 98 communicate with one another, the internal pressure in the bag 90 is uniformly transmitted to the expansion chambers 100, 102, 104 and 106 and not applied thereto in a partially biased state even if the pressure in the bag 90 is abruptly raised. Thus, the bag 90 is brought to a high strength and the cushioning performance of the bag 90 is not reduced. Further, the bag 90 is also fabricated by alternately sewing each of the strap members 96 and 98 on the upper and lower fabrics 92 and 94 so as to integrally connect the upper and lower fabrics 92 and 94 and the strap members 96 and 98 to one another. Therefore, the bag 90 can be fabricated under a series of simple operations and reduced in cost.

Even in the case of the third embodiment, the number of the expansion chambers can be increased and decreased as needed by increasing and decreasing the number of the sewing points of each of the strap members 96 and 98. Further, the two strap members 96 and 98 are used in the third embodiment. However, the number of the strap members is not necessarily limited to that employed in the third embodiment. Three or more strap members may be used.

Having now fully described the invention, it will be apparent to those skilled in the art that many changes and modifications can be made without departing from the spirit or scope of the invention as set forth herein.

What is claimed is:

1. A bag suitable for use in an air bag apparatus activated upon application of a predetermined load or above, said bag being expandable towards a side of an occupant, said bag comprising:

a first fabric disposed to be positioned on said occupant side upon activation of said air bag apparatus;

a second fabric disposed to be positioned on a side of a gas generating inflator mounted to a vehicle body, and having peripheral ends respectively sewn on a peripheral end of said first fabric so as to form said bag;

at least one continuous strap member having a dimension narrower than a dimension of said bag, extending in a first direction thereof, said at least one strap member being alternately sewn on said first and second fabrics in a zig-zag configuration and thereby dividing an inside of said bag into a plurality of chambers along a second direction orthogonal to said first direction; and communicating means for causing adjoining chambers of said plurality of chambers to communicate with each other.

2. A bag according to claim 1, wherein said communicating means includes a plurality of holes respectively defined in portions of said strap member, which are provided between said adjacent chambers.

3. A bag according to claim 2, wherein said holes are provided so as to meet substantially in alignment with each other upon expansion of said bag.

4. A bag according to claim 2, wherein said communicating means includes spaces respectively defined between edges of said strap member, extending in the first direction and portions of said bag, provided in opposing relationship to said edges.

5. A bag according to claim 1, wherein a plurality of said strap members are provided so as to be spaced away from one another along the first direction and said communicating means include spaces defined between said adjoining strap members.

6. A bag according to claim 1, wherein said communicating means includes an elongated aperture defined in said strap member, said aperture extending along the longitudinal direction of said strap member over stitches at which said strap member and said bag are sewn together, said stitches excluding stitches at which longitudinally-extending ends of said strap member and said bag are sewn together.

7. A bag according to claim 1, wherein said air bag apparatus is mounted to a vehicle door.

8. A bag mounted to the side of a vehicle and suitable for use in an air bag apparatus activated when a predetermined load or above is applied to the vehicle side, said bag being expandable toward a side of an occupant, said bag comprising:

a first substantially rectangular fabric provided so as to be positioned on an occupant's side when said air bag apparatus is activated;

a second substantially rectangular fabric provided so as to be positioned on a vehicle interior side upon activation of said air bag apparatus and having peripheral ends respectively sewn on peripheral ends of said first substantially rectangular fabric so as to form said bag;

at least one continuous strap member having a dimension narrower that a dimension of said expanded bag, extending in a longitudinal direction of said vehicle, said at least one strap member being alternately sewn on said first and second substantially rectangular fabrics in a ziz-zag configuration and so as to divide an inside of said bag into a plurality of chambers along upward and downward directions of said vehicle upon expansion of said bag; and communicating means for causing adjoining chambers of said plurality of chambers to communicate with each other.

9. A bag according to claim 8, wherein said communicating means includes a plurality of holes respectively defined in portions of said strap member, which are disposed between said adjacent chambers.

10. A bag according to claim 9, wherein said holes are provided so as to meet substantially in alignment with each other upon expansion of said bag.

11. A bag according to claim 9, wherein said communicating means includes spaces respectively defined between edges of said strap member, extending in the longitudinal direction of the vehicle and portions of said bag, provided in opposing relationship to said edges.

12. A bag according to claim 8, wherein a plurality of said strap members are provided so as to be spaced away from one another along the longitudinal direction of the vehicle and said communicating means include spaces defined between said adjoining strap members.

13. A bag according to claim 8, wherein said communicating means includes an elongated aperture defined in said strap member, said aperture extending along the longitudinal direction of said strap member over stitches at which said strap member and said bag are sewn together, said stitches excluding stitches at which longitudinally-extending ends of said strap member and said bag are sewn together.

14. A bag according to claim 8, wherein said air bag apparatus is mounted to a vehicle door.

15. A method of manufacturing a bag suitable for use in an air bag apparatus activated upon application of a predetermined load or above, said bag including a first fabric disposed on an occupant side upon activation of said air bag apparatus and a second fabric disposed on a side of a gas generating inflator mounted to a vehicle body, and being formed by sewing peripheral ends of said first and second fabrics to each other in bag form and being expandable towards the side of the occupant, said method comprising the steps of:

a first step of sewing together portions of peripheral ends of said first and second fabrics;

a second step of sewing one end of a strap member on one of said first and second fabrics, said strap member being narrower than said first and second fabrics between said first and second fabrics, said strap member being sewn in a ziz-zag configuration;

a third step of sewing an intermediate portion of said strap member on the other of said first and second fabrics so a to define a chamber inside of said bag by a portion of said strap member;

a fourth step of alternately sewing said strap member on said first and second fabric so as to successively define a desired number of chambers in a predetermined direction; and a fifth step of sewing together remaining peripheral ends of said first and second fabrics after completion of said fourth step.

16. The method according to claim 15, further comprising a step of defining a plurality of communication holes for causing adjacent chambers to communicate with each other in said strap member, before execution of said second step at the latest.

17. A method according to claim 15, wherein said strap member is formed as a single continuous band-shaped body.

18. The method according to claim 15, wherein a plurality of said strap members are provided, said strap members arranged substantially at a right angle to a direction in which said chambers are defined.

19. The method according to claim 15, wherein a plurality of strap members are installed and are spaced apart from one another.

20. The method according to claim 19, wherein space defined between adjacent strap members are communicating portions between adjacent chambers.

* * * * *